United States Patent
Wu et al.

(10) Patent No.: US 11,954,409 B2
(45) Date of Patent: Apr. 9, 2024

(54) METHOD FOR PLANNING DISTRIBUTION NETWORK WITH RELIABILITY CONSTRAINTS BASED ON FEEDER CORRIDOR

(71) Applicant: Tsinghua University, Beijing (CN)

(72) Inventors: Wenchuan Wu, Beijing (CN); Boming Zhang, Beijing (CN); Zihao Li, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 545 days.

(21) Appl. No.: 17/366,199

(22) Filed: Jul. 2, 2021

(65) Prior Publication Data

US 2021/0334429 A1 Oct. 28, 2021

Related U.S. Application Data

(63) Continuation of application No. PCT/CN2020/085972, filed on Apr. 21, 2020.

(30) Foreign Application Priority Data

Apr. 8, 2020 (CN) .......................... 202010268609.2

(51) Int. Cl.
G06F 30/18 (2020.01)
G06F 111/04 (2020.01)
(Continued)

(52) U.S. Cl.
CPC ....... *G06F 30/18* (2020.01); *G06Q 10/06313* (2013.01); *G06Q 50/06* (2013.01);
(Continued)

(58) Field of Classification Search
CPC .. G06F 30/18; G06F 2111/04; G06F 2111/06; G06F 2113/04; G06F 2119/02;
(Continued)

(56) References Cited

PUBLICATIONS

Bernardon, D. P., et al. "Methodology for allocation of remotely controlled switches in distribution networks based on a fuzzy multi-criteria decision making algorithm." Electric power systems research 81.2 (2011): 414-420. (Year: 2011).*

(Continued)

*Primary Examiner* — John E Johansen
(74) *Attorney, Agent, or Firm* — Hodgson Russ LLP

(57) ABSTRACT

The present disclosure provides a method for planning a distribution network with reliability constraints based on a feeder corridor, including determining installation states of respective elements in the distribution network; determining an objective function, the objective function being an objective function of minimizing a total investment cost of the distribution network; obtaining fault-isolation-and-load-transfer time and fault recovery time in a case where the feeder segment of each feeder line that is contained in each feeder corridor fails; determining constraint conditions including reliability constraints; building a distribution network planning model according to the objective function and the constraints; and solving the distribution network planning model built to obtain optimal solutions as planning states and reliability indexes to plan the distribution network.

4 Claims, 1 Drawing Sheet

(51) Int. Cl.
  *G06F 113/04* (2020.01)
  *G06F 119/02* (2020.01)
  *G06Q 10/0631* (2023.01)
  *G06Q 50/06* (2024.01)
  *H02J 3/00* (2006.01)
  *G06F 111/06* (2020.01)
  *G06Q 50/08* (2012.01)

(52) U.S. Cl.
  CPC ....... *H02J 3/00125* (2020.01); *G06F 2111/04* (2020.01); *G06F 2111/06* (2020.01); *G06F 2113/04* (2020.01); *G06F 2119/02* (2020.01); *G06Q 50/08* (2013.01); *H02J 2203/20* (2020.01); *Y02E 60/00* (2013.01); *Y04S 40/20* (2013.01)

(58) Field of Classification Search
  CPC .. G06Q 10/06313; G06Q 50/06; G06Q 50/08; H02J 3/00125; H02J 2203/20; Y02E 60/00; Y04S 40/20

USPC .......................................................... 703/18
  See application file for complete search history.

(56) References Cited

PUBLICATIONS

Tyastuti, Retno First, et al. "A genetic algorithm approach determining simultaneously location and capacity distributed generation in radial distribution system." 2015 International Conference on Electrical Engineering and Informatics (ICEEI). IEEE, 2015. (Year: 2015).*

Moskwa, Szczepan, et al. "Multiobjective optimization for switch allocation in radial power distribution grids." 2018 International Conference on Signals and Electronic Systems (ICSES). IEEE, 2018. (Year: 2018).*

Zou, Kai, W. W. L. Keerthipala, and Sarath Perera. "SAIDI minimization of a remote distribution feeder." 2007 Australasian Universities Power Engineering Conference. IEEE, 2007. (Year: 2007).*

* cited by examiner

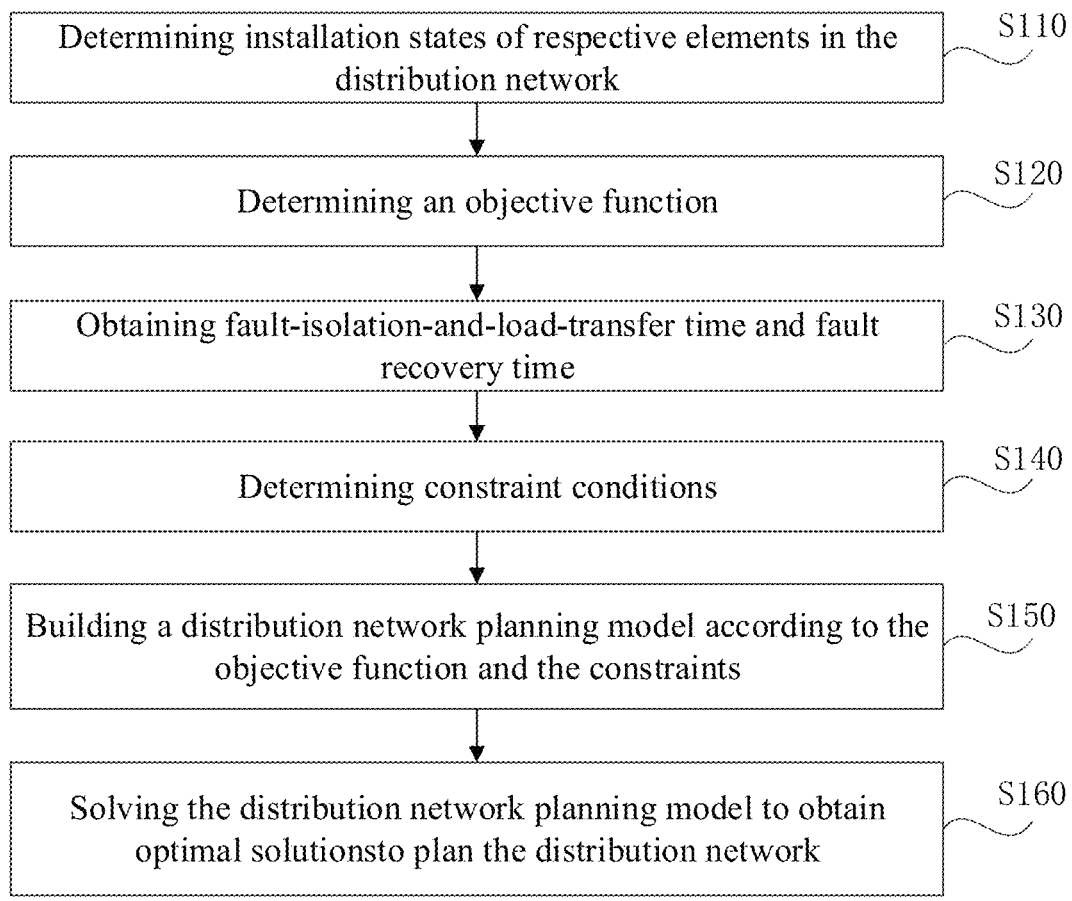

METHOD FOR PLANNING DISTRIBUTION NETWORK WITH RELIABILITY CONSTRAINTS BASED ON FEEDER CORRIDOR

CROSS REFERENCE TO RELATED APPLICATION

This application is a continuation of International Application No. PCT/CN2020/085972, filed on Apr. 21, 2020, which claims priority to Chinese Patent Application No. 202010268609.2, filed on Apr. 8, 2020, the entire disclosures of which are incorporated by reference herein.

TECHNICAL FIELD

The present disclosure relates to a technical field of power system, and more particularly to a method for planning a distribution network with reliability constraints based on a feeder corridor.

BACKGROUND

Distribution network planning plays an important role in planning a power system, for providing a reasonable and economical solution for constructing the distribution network so as to allow the distribution network to meet increasing demand of power load at present or in the future 10 to 30 years.

A feeder corridor refers to a path along which distribution feeder lines may be routed through overhead towers and cables. The feeder corridor is usually planned in advance in an urban planning.

In the field of power, reliability refers to a capability of the power system to continuously meet requirements of end users to the quantity and quality of electronic power. The reliability of the distribution network is generally indicated by several indexes including a customer interruption frequency (CIF), a customer interruption duration (CID), a system average interruption frequency index (SAIFI), a system average interruption duration index (SAIDI), and expected energy not supplied (EENS).

In the related art, most methods for planning the distribution network rely on a set of candidate routes (branches) that have been predetermined manually. That is, a subset of the set of candidate routes may be selected as an input of a planning model, to obtain a final planning solution. However, the candidate routes selected manually may not be considered completely. On the other hand, if it is intended to output a planning model by exhausting the whole set of the candidate routes, the model would not be solvable and could not generate any implementable planning results.

SUMMARY

The present disclosure aims to at least solve the technical problems in the related art to some extents.

For this purpose, method for planning a distribution network with reliability constraints based on a feeder corridor, the distribution network including at least one feeder line, a circuit breaker that is capable of interrupting a fault current being installed at the head of each feeder line, each feeder line being divided into a plurality of feeder segments through at least one interconnection switch that is not capable of interrupting the fault current, at least one of the plurality of feeder segments being contained in the feeder corridor, and 0 or 1 interconnection switch provided between each feeder line and other feeder line, the method comprising:

determining installation states of respective elements in the distribution network, the elements including at least one of the feeder line, the feeder segments, the feeder corridor, the interconnection switch, a transformer, a substation, the circuit breaker, and switching devices;

determining an objective function, the objective function being an objective function of minimizing a total investment cost $C^{Total}$ of the distribution network, as expressed by the following formula (1):

Minimize: (1)

$$C^{Total} = \sum_f \left( c^f l^f + \sum_{ij} c_{ij}^f l_{ij}^f \right) + \sum_{ij} c_{ij} l_{ij} + \sum_i \sum_{fg} c_i^{fg} l_i^{fg} + \sum_{tr} c^{tr} u^{tr} + \sum_{SS} c^{SS} u^{SS} + \omega SAIDI,$$

where
$C^f$ indicates a construction cost of the circuit breaker and a recloser in a feeder line f,
$l^f$ is a 0-1 variable indicating whether to build the feeder line f, with $l^f=1$ indicating to build and $l^f=0$ indicating not to build,
$C_{ij}^f$ indicates a construction cost of the feeder segment of the feeder line f that is contained in the feeder corridor ij,
$l_{ij}^f$ is a 0-1 variable indicating whether to build the feeder segment of the feeder line f that is contained in the feeder corridor ij, with $l_{ij}^f=1$ indicating to build and $l_{ij}^f=0$ indicating not to build,
$C_{ij}$ indicates an occupation cost the feeder corridor ij,
$l_{ij}$ is a 0-1 variable indicating whether to occupy the feeder corridor ij, with $l_{ij}=1$ indicating to occupy and $l_{ij}=0$ indicating not to occupy,
$c_i^{fg}$ indicates a construction cost of the interconnection switch between the feeder line f and a feeder line g at a node i,
$l_i^{fg}$ is a 0-1 variable indicating whether to build the interconnection switch between the feeder line f and the feeder line g at the node i, with $l_i^{fg}=1$ indicating to build and $l_i^{fg}=0$ indicating not to build,
$C^{tr}$ indicates a construction cost of a transformer tr,
$u^{tr}$ is a 0-1 variable indicating whether to build the transformer tr, with $u^{tr}=1$ indicating to build and $u^{tr}=0$ indicating not to build,
$C^{ss}$ indicates a construction cost of a substation SS,
$u^{ss}$ is a 0-1 variable indicating whether to build the substation SS, with $u^{ss}=1$ indicating to build and $u^{ss}=0$ indicating not to build, and
$\omega SAIDI$ indicates a reliability cost, in which $\omega$ is a weighting factor ranging from 1 to 100, and SAIDI indicates a system average interruption duration index;

obtaining fault-isolation-and-load-transfer time and fault recovery time in a case where the feeder segment of each feeder line that is contained in each feeder corridor fails, by the following steps:

opening a circuit breaker in the upstream of a feeder segment to interrupt the fault current upon the feeder segment of the feeder line that is contained in the feeder corridor fails, to cause power outage in downstream nodes of the circuit breaker;

operating all the switching devices and circuit breakers in the distribution network manually to recover the power supply at the outage nodes to the maximum extent; and recovering the fault feeder segment, and restoring the distribution network to its original structure by operating the switching devices and the circuit breaker, wherein, the fault-isolation-and-load-transfer time refers to a time period from the time of failure to the time when the circuit breakers and the switching devices are operated manually for fault isolation and the power is restored to the affected nodes, and wherein the fault recovery time refers to a time from the time of failure to the time when the fault is restored;

determining constraint conditions based on the obtained fault-isolation-and-load-transfer time and fault recovery time, the constraint conditions including reliability constraints, as expressed by the following formulas (2) to (11):

$$CID_i = \sum_{xy} \sum_{h} [\lambda^{[xy,h]} \tau_{SW}^{[xy,h]} p_i^{[xy,h]} + (\tau_{RP}^{[xy,h]} - \tau_{SW}^{[xy,h]})(1 - q_i^{[xy,h]})], \quad (2)$$

$$\forall i \in \Psi;$$

$$CID_i = \sum_{xy} \sum_{h} [\lambda^{[xy,h]} p_i^{[xy,h]}], \quad (3)$$

$$\forall i \in \Psi;$$

$$SAIDI = \frac{\sum_i NC_i CID_i}{\sum_i NC_i}; \quad (4)$$

$$SAIFI = \frac{\sum_i NC_i CIF_i}{\sum_i NC_i}; \quad (5)$$

$$EENS = \sum_{b \in B} \frac{\Delta_b}{8760} \sum_i CID_i \mu_b P_i; \quad (6)$$

$$CIF_i \leq \varepsilon_i^{CIF}, \quad (7)$$
$$\forall i \in \Psi;$$

$$CID_i \leq \varepsilon_i^{CIF}, \quad (8)$$
$$\forall i \in \Psi;$$

$$SAIFI \leq \varepsilon^{SAIFI}; \quad (9)$$

$$SAIDI \leq \varepsilon^{SAIDI}; \quad (10)$$

$$EENS \leq \varepsilon^{EENS}, \quad (11)$$

where $CID_i$ indicates a customer interruption duration at the node i, $\lambda^{[xy,h]}$ indicates an annual failure rate of a feeder segment of a feeder line h that is contained in the feeder corridor xy, $\tau_{SW}^{[xy,h]}$ indicates the fault-isolation-and-load-transfer time in a case where the feeder segment of the feeder line h that is contained in the feeder corridor xy fails, $\tau_{RP}^{[xy,h]}$ indicates the fault recovery time in the case where the feeder segment of the feeder line h that is contained in the feeder corridor xy fails, $CIF_i$ indicates a customer interruption frequency at the node i, $NC_i$ indicates a number of the customers at the node i, SAIFI indicates a system average interruption frequency index, SAIDI indicates a system average interruption duration index, ASAI indicates an average service availability index, EENS indicates an expected energy not supplied, B indicates a set of all load levels, $\Delta_b$ indicates annual hours for which a load level b lasts, $b \in B$, $\mu_b$ indicates a peak load ratio of the load level b, with $\mu_{b \leq} 1$, $L_i$ indicates a peak load at the node i, $\varepsilon_i^{CIF}$ indicates an upper limit of the annual average interruption frequency at the node i, $\varepsilon_i^{CID}$ indicates an upper limit of the annual average interruption duration at the node i, $\varepsilon^{SAIFI}$ indicates an upper limit of the system average interruption frequency index, $\varepsilon^{SAIDI}$ indicates an upper limit of the system average interruption duration index, and $\varepsilon^{EENS}$ indicates an upper limit of the expected energy not supplied;

building a distribution network planning model based on mixed integer linear programming model according to the objective function and the constraints;

solving the distribution network planning model built solving the distribution network planning model built to obtain optimal solutions of the variable $l^f$ indicating whether to build the feeder line f, the variable $l_{ij}^f$ indicating whether to build the feeder segment of the feeder line f that is contained in the feeder corridor ij, the variable $l_{ij}$ indicating whether to occupy the feeder corridor ij, the variable $l_i^{fg}$ indicating whether to build the interconnection switch between the feeder line f and the feeder line g at the node i, the variable $u^{tr}$ indicating whether to build the transformer tr, and the variable $u^{ss}$ indicating whether to build the substation feeder SS, as planning states of the feeder line, the feeder segment, the feeder corridor, the interconnection switch, the transformer and the substation, and to obtain optimal solutions of the customer interruption duration $CID_i$ at the node i, the customer interruption frequency $CIF_i$ at the node i, the system average interruption duration index SAIDI, the system average interruption frequency index SAIFI, and the expected energy not supplied EENS, as reliability indexes, so as to plan the distribution network based on the planning states and reliability indexes.

BRIEF DESCRIPTION OF THE DRAWINGS

FIG. 1 illustrates a flow chart showing a method for planning a distribution network with reliability constraints based on a feeder corridor according to an embodiment of the present disclosure.

DETAILED DESCRIPTION

Hereinafter, various embodiments of the present disclosure will be described in detail with reference to the accompanying drawings.

FIG. 1 illustrates a flow chart showing a method for planning a distribution network with reliability constraints based on a feeder corridor according to an embodiment of the present disclosure.

The distribution network includes at least one feeder line. At the head of each feeder line, a circuit breaker that is capable of interrupting a fault current may be installed. Each feeder line may be divided into a plurality of feeder segments (branches) through at least one interconnection switch that is not capable of interrupting the fault current. At least one of the plurality of feeder segments may be the feeder segment contained in a feeder corridor. There may be 0 or 1 interconnection switch provided between each feeder line and other feeder line.

As shown in the FIG. 1, the method may include the following steps.

At step S110, installation states of respective elements in the distribution network is determined.

The elements may include at least one of the feeder line, the feeder segments, the feeder corridor, the interconnection switch, a transformer, a substation, the circuit breaker, and switching devices.

At step S120, an objective function is determined. The objective function may be an objective function of minimizing a total investment cost $c^{Total}$ of the distribution network, as expressed by the following formula (1):

$$\text{Minimize:} c^{Total} = \Sigma_f (c^f l^f + \Sigma_{ij} c_{ij}{}^f l_{ij}{}^f) + \Sigma_{ij} c_{ij} l_{ij} \Sigma_i \Sigma_{fg} c_i^{fg} l_i^{fg} + \Sigma_{tr} c^{tr} u^{tr} + \Sigma_{SS} c^{SS} u^{SS} = \omega SAIDI \quad (1),$$

where
- $c^f$ indicates a construction cost of the circuit breaker and a recloser in a feeder line f,
- $l^f$ is a 0-1 variable indicating whether to build the feeder line f, with $l^f=1$ indicating to build and $l^f=0$ indicating not to build,
- $c_{ij}{}^f$ indicates a construction cost of the feeder segment of the feeder line f that is contained in the feeder corridor ij,
- $l_{ij}{}^f$ is a 0-1 variable indicating whether to build the feeder segment of the feeder line f that is contained in the feeder corridor ij, with $l_{ij}{}^f=1$ indicating to build and $l_{ij}{}^f=0$ indicating not to build,
- $c_{ij}$ indicates an occupation cost the feeder corridor ij,
- $l_{ij}$ is a 0-1 variable indicating whether to occupy the feeder corridor ij, with $l_{ij}=1$ indicating to occupy and $l_{ij}=0$ indicating not to occupy,
- $c_i^{fg}$ indicates a construction cost of the interconnection switch between the feeder line f and a feeder line g at a node i,
- $l_i^{fg}$ is a 0-1 variable indicating whether to build the interconnection switch between the feeder line f and the feeder line g at the node i, with $l_i^{fg}=1$ indicating to build and $l_i^{fg}=0$ indicating not to build,
- $c^{tr}$ indicates a construction cost of a transformer tr,
- $u^{tr}$ is a 0-1 variable indicating whether to build the transformer tr, with $u^{tr}=1$ indicating to build and $u^{tr}=0$ indicating not to build,
- $c^{SS}$ indicates a construction cost of a substation SS,
- $u^{SS}$ is a 0-1 variable indicating whether to build the substation SS, with $u^{SS}=1$ indicating to build and $u^{SS}=0$ indicating not to build, and
- $\omega SAIDI$ indicates a reliability cost, in which $\omega$ is a weighting factor ranging from 1 to 100, and SAIDI indicates a system average interruption duration index.

At step S130, fault-isolation-and-load-transfer time and fault recovery time in a case where the feeder segment of each feeder line that is contained in each feeder corridor fails is obtained.

The fault-isolation-and-load-transfer time and the fault recovery time are obtained by the following steps.

It is assumed that the circuit breaker in the feeder line is closed in normal operation. Upon a feeder segment of the feeder line that is contained in the feeder corridor fails, a circuit breaker in the upstream of the feeder segment is opened first to interrupt the fault current, to cause power outage in downstream nodes of the circuit breaker. Then, all the switching devices and circuit breakers in the distribution network are operated manually to recover the power supply at the outage nodes to the maximum extent. Finally, the fault feeder segment is recovered. After that, the distribution network is restored to its original structure by operating the switching devices and the circuit breaker.

Specifically, the fault-isolation-and-load-transfer time refers to a time period from the time of failure to the time when the circuit breakers and the switching devices are operated manually for fault isolation and the power is restored to the affected nodes.

Further, the fault recovery time refers to a time from the time of failure to the time when the fault is restored.

At step S140, constraint conditions are determined based on the obtained fault-isolation-and-load-transfer time and fault recovery time. The constraint conditions includes reliability constraints, as expressed by the following formulas (2) to (11):

$$CID_i = \sum_{xy} \sum_h [\lambda^{[xy,h]} \tau_{SW}^{[xy,h]} p_i^{[xy,h]} + (\tau_{RP}^{[xy,h]} - \tau_{SW}^{[xy,h]})(1 - q_i^{[xy,h]})], \quad (2)$$

$$\forall i \in \Psi;$$

$$CID_i = \sum_{xy} \sum_h [\lambda^{[xy,h]} p_i^{[xy,h]}], \quad (3)$$

$$\forall i \in \Psi;$$

$$SAIDI = \frac{\sum_i NC_i CID_i}{\sum_i NC_i}; \quad (4)$$

$$SAIFI = \frac{\sum_i NC_i CIF_i}{\sum_i NC_i}; \quad (5)$$

$$EENS = \sum_{b \in B} \frac{\Delta_b}{8760} \sum_i CID_i \mu_b P_i; \quad (6)$$

$$CIF_i \leq \varepsilon_i^{CIF}, \quad (7)$$

$$\forall i \in \Psi;$$

$$CID_i \leq \varepsilon_i^{CIF}, \quad (8)$$

$$\forall i \in \Psi;$$

$$SAIFI \leq \varepsilon^{SAIFI}; \quad (9)$$

$$SAIDI \leq \varepsilon^{SAIDI}; \quad (10)$$

$$EENS \leq \varepsilon^{EENS}, \quad (11)$$

where
- $CID_i$ indicates a customer interruption duration at the node i,
- $\lambda^{[xy,h]}$ indicates an annual failure rate of a feeder segment of a feeder line h that is contained in the feeder corridor xy,
- $\tau_{SW}^{[xy,h]}$ indicates the fault-isolation-and-load-transfer time in a case where the feeder segment of the feeder line h that is contained in the feeder corridor xy fails,
- $\tau_{RP}^{[xy,h]}$ indicates the fault recovery time in the case where the feeder segment of the feeder line h that is contained in the feeder corridor xy fails,
- $CIF_i$ indicates a customer interruption frequency at the node i,
- $NC_i$ indicates a number of the customers at the node i, SAIFI indicates a system average interruption frequency index,
SAIDI indicates a system average interruption duration index,
ASAI indicates an average service availability index,
EENS indicates an expected energy not supplied,
B indicates a set of all load levels,
$\Delta_b$ indicates annual hours for which a load level b lasts, b∈B,
$\mu_b$ indicates a peak load ratio of the load level b, with $\mu_b \leq 1$,
$L_i$ indicates a peak load at the node i,
$\varepsilon_i^{CIF}$ indicates an upper limit of the annual average interruption frequency at the node i,
$\varepsilon_i^{CID}$ indicates an upper limit of the annual average interruption duration at the node i,
$\varepsilon^{SAIFI}$ indicates an upper limit of the system average interruption frequency index,
$\varepsilon^{SAIDI}$ indicates an upper limit of the system average interruption duration index, and
$\varepsilon^{EENS}$ indicates an upper limit of the expected energy not supplied.

It is noted that the above upper limits may be set as necessary by the planners and are not specifically limited here.

In an embodiment, the constraint conditions may further include constraints of power balance and branching in a normal operation state of the distribution network, as expressed by the following formulas (12) to (19):

$$\sum_{j \in \Psi_i} P_{ij}^{f,NO} + P_i^{f,NO} = 0, \quad (12)$$

$\forall i \notin \Psi^{SS}$,
$\forall f \in \Omega$;

$$\sum_{j \in \Psi_i} P_{ij}^{f,NO} + P_i^{f,NO} = P_{tr}^{f,NO}, \quad (13)$$

$\forall i \in \Psi^{SS}$;

$$\sum_{f} P_i^{f,NO} = P_i, \quad (14)$$

$\forall i \in \Psi$;

$$-MF_i^f \leq P_i^{f,NO} \leq MF_i^f, \quad (15)$$

$\forall i \in \Psi$,
$\forall f \in \Omega$;

$$\sum_{f} F_i^f \leq 1, \quad (16)$$

$\forall i \in \Psi$;

$$-Mk_{ij}^{f,NO} \leq P_{ij}^{f,NO} \leq Mk_{ij}^{f,NO}, \quad (17)$$

$\forall ij \in \gamma$,
$\forall f \in \Omega$;

$$-S_{fd}^f \leq P_{ij}^{f,NO} \leq S_{fd}^f, \quad (18)$$

$\forall ij \in \gamma$,
$\forall f \in \Omega$;

$$\sum_{f \in \Omega^{tr}} P_{tr}^{f,NO} \leq S_{tr}, \quad (19)$$

$\forall tr$, where
$P_{ij}^{f,NO}$ indicates active power flowing from the node i to a node j through the feeder line f in the normal operation state,
$\Psi_i$ indicates a set of nodes connected to the node i directly,
$P_i^{f,NO}$ indicates active load power at the node i where the feeder line f is located in the normal operation state,
$\Psi^{SS}$ indicates a set of nodes where the substations are located,
$\Omega$ indicates a set of all the feeder lines,
$P_{tr}^{f,NO}$ indicates active power outputted from the transformer tr to the feeder line f in the normal operation state,
$P_i$ indicates active load power at the node i,
$\Psi$ indicates a set of all the nodes,
M represents a large positive number ranging from 10,000 to 10,000,000, and is 1,000,000 in this embodiment,
$F_i^f$ is a 0-1 variable indicating whether to supply power to the node i through the feeder line f in the normal operation state, with $F_i^f=1$ indicating to supply and $F_i^f=0$ indicating not to supply,
$k_{ij}^{f,NO}$ is a 0-1 variable indicating a connection state of the feeder segment of the feeder line f that is contained in the feeder corridor ij in the normal operation state, with $k_{ij}^{f,NO}=1$ indicating being connected and $k_{ij}^{f,NO}=0$ indicating being disconnected,
Y indicates a set of all the feeder corridors,
$S_{fd}^f$ indicates a capacity of the feeder line f,
$S_{tr}$ indicates a capacity of the transformer tr, and
$\Omega^{tr}$ indicates a set of the feeder lines belong to the transformer tr.

In an embodiment, the constraint conditions may further include constraints of power balance and branching in a fault state of the distribution network, as expressed by the following formulas (20) to (30):

$$k_{xy}^{h,[xy,h]} = 0; \quad (20)$$

$$k_{xy}^{h,NO} + F_i^h - 1 \leq p_i^{[xy,h]}, \forall i; \quad (21)$$

$$\sum_{j \in \Psi_i} P_{ij}^{f,[xy,h]} + P_i^{f,[xy,h]} + \sum_{g \neq f} P_i^{fg,[xy,h]} = 0, \forall i \notin \Psi^{SS}, \forall f \in \Omega; \quad (22)$$

$$\sum_{j \in \Psi_i} P_{ij}^{f,[xy,h]} + P_i^{f,[xy,h]} + \sum_{g \neq f} P_i^{fg,[xy,h]} = P_{tr}^{f,[xy,h]}, \forall i \in \Psi^{SS}; \quad (23)$$

$$\sum_{f} P_i^{f,[xy,h]} = q_i^{[xy,h]} P_i, \forall i \in \Psi; \quad (24)$$

$$q_i^{[xy,h]} \geq 1 - p_i^{[xy,h]}, \forall i \in \Psi \quad (25)$$

$$-MF_i^f \leq P_i^{f,[xy,h]} \leq MF_i^f, \forall i \in \Psi, \forall f \in \Omega; \quad (26)$$

$$-Mk_i^{fg,[xy,h]} \leq P_i^{fg,[xy,h]} \leq Mk_i^{fg,[xy,h]}, \forall ij \in \Upsilon, \forall f \in \Omega; \quad (27)$$

$$-Mk_{ij}^{f,[xy,h]} \leq P_{ij}^{f,[xy,h]} \leq Mk_{ij}^{f,[xy,h]]}, \forall ij \in \Upsilon, \forall f \in \Omega; \quad (28)$$

$$-S_{fd}^f \leq P_{ij}^{f,[xy,h]} \leq S_{fd}^f, \forall ij \in \Upsilon, \forall f \in \Omega; \quad (29)$$

$$P_{tr}^{f,[xy,h]} \leq S_{tr}^f, \forall f \in \Omega^{tr}, \quad (30)$$

where $\forall[xy,h]$ is applicable to all the formulas (20) to (30), and
where
$k_{ij}^{f,[xy,h]}$ is a 0-1 variable indicating a connection state of the feeder segment of the feeder line f that is contained in the feeder corridor ij in a case where the feeder segment of the feeder line h that is contained in the feeder corridor xy fails, with $k_{ij}^{f,[xy,h]}=1$ indicating being connected and $k_{ij}^{f,[xy,h]}=0$ indicating being disconnected,
$p_i^{[xy,h]}$ is a 0-1 variable indicating an affected state of the load at the node i in the case where the feeder segment of the feeder line h that is contained in the feeder corridor xy fails, with $p_i^{[xy,h]}=1$ indicating being affected to lose power supply and $p_i^{[xy,h]}=0$ indicating not being affected, $P_{ij}^{f,[xy,h]}$ indicates active power flowing from the node i to the node j through the feeder line f in the case where the feeder segment of the feeder line h that is contained in the feeder corridor xy fails, $P_i^{f,[xy,h]}$ indicates active load power at the node i where the feeder line f is located in the case where the feeder segment of the feeder line h that is contained in the feeder corridor xy fails, $P_i^{fg,[xy,h]}$ indicates active power flowing from the feeder line f to the feeder line g at the node i via the interconnection switch in the case where the feeder segment of the feeder line h that is contained in the feeder corridor xy fails, $P_{tr}^{f,[xy,h]}$ indicates active power outputted from the transformer tr to the feeder line f in the case where the feeder segment of the feeder line h that is contained in the feeder corridor xy fails, $P_i^{f,[xy,h]}$ indicates active power outputted from the transformer tr to the feeder line f in the case where the feeder segment of the feeder line h that is contained in the feeder corridor xr fails, $q_i^{[xy,h]}$ is a 0-1 variable indicating a state of power supply at the node i in the case where the feeder segment of the feeder line h that is contained in the feeder corridor xy fails, with $q_i^{[xy,h]}=1$ indicating normal power supply and $p_i^{[xy,h]}=0$ indicating loss of power supply, and

[xy,h] indicates a scenario in which the feeder segment of the feeder line h that is contained in the feeder corridor xy fails.

In an embodiment, the constraint conditions may further include constraints of equipment construction, as expressed by the following formulas (31) to (36):

$$k_{ij}^{f,NO} \le l_{ij}^f, \quad (31)$$
$$\forall ij \in \gamma,$$
$$\forall f \in \Omega;$$

$$k_{ij}^{f,[xy,h]} \le l_{ij}^f, \quad (32)$$
$$\forall ij \in \gamma,$$
$$\forall f \in \Omega,$$
$$\forall [xy, h];$$

$$k_i^{fg,[xy,h]} \le l_i^{fg}, \quad (33)$$
$$\forall i \in \Psi,$$
$$\forall fg,$$
$$\forall [xy, h];$$

$$\sum_f l_{ij}^f \le N_{ij} l_{ij}, \quad (34)$$
$$\forall ij \in \gamma;$$

$$\sum_{f \in \Omega^{tr}} l^f \le N^{tr} u^{tr}, \quad (35)$$
$$\forall tr;$$

$$\sum_{tr \in \Lambda^{SS}} u^{tr} \le N^{SS} u^{SS}, \quad (36)$$
$$\forall SS,$$

where
$N_{ij}$ indicates a number of the feeder segments that may be contained in the feeder corridor ij, $N^{tr}$ indicates a number of the feeder lines that may be arranged from the transformer tr, $N^{SS}$ indicates a number of the transformers that may be supported by the substation SS, and $\Lambda^{SS}$ indicates a set of the transformers belonging to the substation SS.

In step S150, a distribution network planning model based on mixed integer linear programming model is built according to the objective function and the constraints.

In step S160, the distribution network planning model built is solved, solving the distribution network planning model built to obtain optimal solutions of the variable $l^f$ indicating whether to build the feeder line f, the variable $l_{ij}^f$ indicating whether to build the feeder segment of the feeder line f that is contained in the feeder corridor ij, the variable $l_{ij}$ indicating whether to occupy the feeder corridor ij, the variable $l_i^{fg}$ indicating whether to build the interconnection switch between the feeder line f and the feeder line g at the node i, the variable $u^{tr}$ indicating whether to build the transformer tr, and the variable $u^{ss}$ indicating whether to build the substation feeder SS, as planning states of the feeder line, the feeder segment, the feeder corridor, the interconnection switch, the transformer and the substation, and to obtain optimal solutions of the customer interruption duration $CID_i$ at the node i, the customer interruption frequency $CIF_i$ at the node i, the system average interruption duration index SAIDI, the system average interruption frequency index SAIFI, and the expected energy not supplied EENS, as reliability indexes, so as to plan the distribution network based on the planning states and reliability indexes.

In the embodiment, the distribution network planning model built may be solved by the branch-and-bound method and the linear programming method.

The method for planning the distribution network with the reliability constraints based on the feeder corridor according to the embodiment of the present disclosure may build the distribution network planning model by using the investment cost of the distribution network as the objective function, and comprehensively planning the substation, the transformer, the feeder line and the interconnection switch in the distribution network based on the information about the substation, the load distribution and the feeder corridor. The model is a mixed integer linear programming model that may be solved directly by a solver, avoiding the complexity and unreliability of traditional planning methods which would generate a set of candidate routes and then select among them. Accordingly, the calculation in the method according to the present disclosure is highly efficient and accurate. Additionally, the planning results satisfying the reliability constraints may be determined by solving the model, which reduces the cost of the distribution network In addition, the feeder corridors are usually planned in advance in urban planning, which is easier to get compared with the set of candidate routes. Accordingly, with the method according to the present disclosure, the distribution network planning model directly based on the information about the feeder corridors may skip the step of generating the set of candidate routes, which is more practical and effective in actual planning projects. Further, when calculating the reliability indexes, the present disclosure may build the model directly based on the feeder corridors without searching tentatively or generating the set of candidate routes, avoiding the time investment and labor cost in generating the set of candidate routes.

In addition, the method accordingly the present disclosure is simple and easy to implement, thereby obtaining the optimal scheme with the reliability constraints satisfied and the investment cost reduced.

Although embodiments of the present disclosure are illustrated and described above, it should be understood that the above embodiments are exemplary and should not be construed as limiting the present disclosure, and the skilled in the art may make changes, modifications, substitutions and variations to the above embodiments within the scope of the present disclosure.

What is claimed is:

1. A method for planning a distribution network with reliability constraints based on a feeder corridor, the distribution network comprising at least one feeder line, a circuit breaker that is capable of interrupting a fault current being installed at a head of each feeder line, each feeder line being divided into a plurality of feeder segments through at least one interconnection switch that is not capable of interrupting the fault current, at least one of the plurality of feeder segments being contained in the feeder corridor, and 0 or 1 interconnection switch provided between each feeder line and other feeder line, the method comprising:

determining installation states of respective elements in the distribution network, the elements comprising at least one of the feeder line, the feeder segments, the feeder corridor, the interconnection switch, a transformer, a substation, the circuit breaker, and switching devices;

determining an objective function, the objective function being an objective function of minimizing a total investment cost $C^{Total}$ of the distribution network, as expressed by the following formula (1):

Minimize: (1)

$$C^{Total} = \sum_f \left( c^f l^f + \sum_{ij} c_{ij}^f l_{ij}^f \right) + \sum_{ij} c_{ij} l_{ij} + \sum_i \sum_{fg} c_i^{fg} l_i^{fg} + \sum_{tr} c^{tr} u^{tr} + \sum_{SS} c^{SS} u^{SS} + \omega SAIDI,$$

where $C^f$ indicates a construction cost of the circuit breaker and a recloser in a feeder line f, $l^f$ is a 0-1 variable indicating whether to build the feeder line f, with $l^f=1$ indicating to build and $l^f=0$ indicating not to build, $C_{ij}^f$ indicates a construction cost of the feeder segment of the feeder line f that is contained in the feeder corridor ij, $l_{ij}^f$ is a 0-1 variable indicating whether to build the feeder segment of the feeder line f that is contained in the feeder corridor ij, with $l_{ij}^f=1$ indicating to build and $l_{ij}^f=0$ indicating not to build, $C_{ij}$ indicates an occupation cost the feeder corridor ij, $l_{ij}$ is a 0-1 variable indicating whether to occupy the feeder corridor ij, with $l_{ij}=1$ indicating to occupy and $l_{ij}=0$ indicating not to occupy, $c_i^{fg}$ indicates a construction cost of the interconnection switch between the feeder line f and a feeder line g at a node i, $l_i^{fg}$ is a 0-1 variable indicating whether to build the interconnection switch between the feeder line f and the feeder line g at the node i, with $l_i^{fg}=1$ indicating to build and $l_i^{fg}=0$ indicating not to build, $C^{tr}$ indicates a construction cost of a transformer tr, $u^{tr}$ is a 0-1 variable indicating whether to build the transformer tr, with $u^{tr}=1$ indicating to build and $u^{tr}=0$ indicating not to build, $C^{SS}$ indicates a construction cost of a substation SS, $u^{ss}$ is a 0-1 variable indicating whether to build the substation SS, with $u^{ss}=1$ indicating to build and $u^{ss}=0$ indicating not to build, and $\omega SAIDI$ indicates a reliability cost, in which $\omega$ is a weighting factor ranging from 1 to 100, and SAIDI indicates a system average interruption duration index;

obtaining fault-isolation-and-load-transfer time and fault recovery time in a case where the feeder segment of each feeder line that is contained in each feeder corridor fails, by the following steps:

opening a circuit breaker upstream of a feeder segment to interrupt the fault current upon the feeder segment of the feeder line that is contained in the feeder corridor fails, to cause power outage in downstream nodes of the circuit breaker;

operating all the switching devices and circuit breakers in the distribution network manually to recover the power supply at the outage nodes to the maximum extent; and recovering the fault feeder segment, and restoring the distribution network to its original structure by operating the switching devices and the circuit breaker, wherein, the fault-isolation-and-load-transfer time refers to a time period from the time of failure to the time when the circuit breakers and the switching devices are operated manually for fault isolation and the power is restored to the affected nodes, and wherein, the fault recovery time refers to a time from the time of failure to the time when the fault is restored;

determining constraint conditions based on the obtained fault-isolation-and-load-transfer time and fault recovery time, the constraint conditions comprising reliability constraints, as expressed by the following formulas (2) to (11):

$$CID_i = \sum_{xy} \sum_h [\lambda^{[xy,h]} \tau_{SW}^{[xy,h]} p_i^{[xy,h]} + (\tau_{RP}^{[xy,h]} - \tau_{SW}^{[xy,h]})(1 - q_i^{[xy,h]})], \quad (2)$$

$\forall i \in \Psi$;

$$CID_i = \sum_{xy} \sum_h [\lambda^{[xy,h]} p_i^{[xy,h]}], \quad (3)$$

$\forall i \in \Psi$;

$$SAIDI = \frac{\sum_i NC_i CID_i}{\sum_i NC_i}; \quad (4)$$

$$SAIFI = \frac{\sum_i NC_i CIF_i}{\sum_i NC_i}; \quad (5)$$

$$EENS = \sum_{b \in B} \frac{\Delta_b}{8760} \sum_i CID_i \mu_b P_i; \quad (6)$$

$$CIF_i \leq \varepsilon_i^{CIF}, \quad (7)$$

$\forall i \in \Psi$;

-continued $$CID_i \leq \varepsilon_i^{CIF}, \quad (8)$$
$$\forall i \in \Psi;$$

$$SAIFI \leq \varepsilon^{SAIFI}; \quad (9)$$

$$SAIDI \leq \varepsilon^{SAIDI}; \quad (10)$$

$$EENS \leq \varepsilon^{EENS}, \quad (11)$$

where
$CID_i$ indicates a customer interruption duration at the node i,
$\lambda^{[xy,h]}$ indicates an annual failure rate of a feeder segment of a feeder line h that is contained in the feeder corridor xy,
$\tau_{SW}^{[xy,h]}$ indicates the fault-isolation-and-load-transfer time in a case where the feeder segment of the feeder line h that is contained in the feeder corridor xy fails,
$\tau_{RP}^{[xy,h]}$ indicates the fault recovery time in the case where the feeder segment of the feeder line h that is contained in the feeder corridor xy fails,
$CIF_i$ indicates a customer interruption frequency at the node i,
$NC_i$ indicates a number of the customers at the node i,
SAIFI indicates a system average interruption frequency index,
SAIDI indicates a system average interruption duration index,
ASAI indicates an average service availability index,
EENS indicates an expected energy not supplied,
B indicates a set of all load levels,
$\Delta_b$ indicates annual hours for which a load level b lasts, $b \in B$,
$\mu_b$ indicates a peak load ratio of the load level b, with $\mu_b \leq 1$,
$L_i$ indicates a peak load at the node i,
$\varepsilon_i^{CIF}$ indicates an upper limit of the annual average interruption frequency at the node i,
$\varepsilon_i^{CID}$ indicates an upper limit of the annual average interruption duration at the node i,
$\varepsilon^{SAIFI}$ indicates an upper limit of the system average interruption frequency index,
$\varepsilon^{SAIDI}$ indicates an upper limit of the system average interruption duration index, and
$\varepsilon^{EENS}$ indicates an upper limit of the expected energy not supplied;
building a distribution network planning model based on mixed integer linear programming model according to the objective function and the constraints;
solving the distribution network planning model built
solving the distribution network planning model built to obtain optimal solutions of the variable $I^f$ indicating whether to build the feeder line f, the variable $l_{ij}^f$ indicating whether to build the feeder segment of the feeder line f that is contained in the feeder corridor ij, the variable $l_{ij}$ indicating whether to occupy the feeder corridor ij, the variable $l_i^{fg}$ indicating whether to build the interconnection switch between the feeder line f and the feeder line g at the node i, the variable $u^{tr}$ indicating whether to build the transformer tr, and the variable $u^{ss}$ indicating whether to build the substation feeder SS, as planning states of the feeder line, the feeder segment, the feeder corridor, the interconnection switch, the transformer and the substation, and to obtain optimal solutions of the customer interruption duration $CID_i$ at the node i, the customer interruption frequency $CIF_i$ at the node i, the system average interruption duration index SAIDI, the system average interruption frequency index SAIFI, and the expected energy not supplied EENS, as reliability indexes, so as to plan the distribution network based on the planning states and reliability indexes.

2. The method according to claim 1, wherein the constraint conditions further comprises constraints of power balance and branching in a normal operation state of the distribution network, as expressed by the following formulas (12) to (19):

$$\sum_{j \in \Psi_i} P_{ij}^{f,NO} + P_i^{f,NO} = 0, \quad (12)$$
$$\forall i \notin \Psi^{SS},$$
$$\forall f \in \Omega;$$

$$\sum_{j \in \Psi_i} P_{ij}^{f,NO} + P_i^{f,NO} = P_{tr}^{f,NO}, \quad (13)$$
$$\forall i \in \Psi^{SS};$$

$$\sum_f P_i^{f,NO} = P_i, \quad (14)$$
$$\forall i \in \Psi;$$

$$-MF_i^f \leq P_i^{f,NO} \leq MF_i^f, \quad (15)$$
$$\forall i \in \Psi,$$
$$\forall f \in \Omega;$$

$$\sum_f F_i^f \leq 1, \quad (16)$$
$$\forall i \in \Psi;$$

$$-Mk_{ij}^{f,NO} \leq P_{ij}^{f,NO} \leq Mk_{ij}^{f,NO}, \quad (17)$$
$$\forall ij \in \gamma,$$
$$\forall f \in \Omega;$$

$$-S_{fd}^f \leq P_{ij}^{f,NO} \leq S_{fd}^f, \quad (18)$$
$$\forall ij \in \gamma,$$
$$\forall f \in \Omega;$$

$$\sum_{f \in \Omega^{tr}} P_{tr}^{f,NO} \leq S_{tr}, \quad (19)$$
$$\forall tr$$

where
$P_{ij}^{f,NO}$ indicates active power flowing from the node i to a node j through the feeder line f in the normal operation state,
$\Psi_i$ indicates a set of nodes connected to the node i directly,
$P_i^{f,NO}$ indicates active load power at the node i where the feeder line f is located in the normal operation state,
$\Psi^{SS}$ indicates a set of nodes where the substations are located,
$\Omega$ indicates a set of all the feeder lines,
$P_{tr}^{f,NO}$ indicates active power outputted from the transformer tr to the feeder line f in the normal operation state,
$P_i$ indicates active load power at the node i,
$\Psi$ indicates a set of all the nodes,
M represents a large positive number ranging from 10,000 to 10,000,000, and is 1,000,000 in this embodiment,
$F_i^f$ is a 0-1 variable indicating whether to supply power to the node i through the feeder line f in the normal operation state, with $F_i^f=1$ indicating to supply and $F_i^f=0$ indicating not to supply, $k_{ij}^{f,NO}$ is a 0-1 variable indicating a connection state of the feeder segment of the feeder line f that is contained in the feeder corridor ij in the normal operation state, with $k_{ij}^{f,NO}=1$ indicating being connected and $k_{ij}^{f,NO}=0$ indicating being disconnected, Y indicates a set of all the feeder corridors, $S_{fd}^f$ indicates a capacity of the feeder line f, $S_{tr}$ indicates a capacity of the transformer tr, and $\Omega^{tr}$ indicates a set of the feeder lines belong to the transformer tr.

3. The method according to claim 1, wherein the constraint conditions further comprises constraints of power balance and branching in a fault state of the distribution network, as expressed by the following formulas (20) to (30):

$$k_{xy}^{h,[xy,h]} = 0; \qquad (20)$$

$$k_{xy}^{h,NO} + F_i^h - 1 \le p_i^{[xy,h]}, \forall i; \qquad (21)$$

$$\sum_{j \in \Psi_i} P_{ij}^{f,[xy,h]} + P_i^{f,[xy,h]} + \sum_{g \ne f} P_i^{fg,[xy,h]} = 0, \forall i \notin \Psi^{SS}, \forall f \in \Omega; \qquad (22)$$

$$\sum_{j \in \Psi_i} P_{ij}^{f,[xy,h]} + P_i^{f,[xy,h]} + \sum_{g \ne f} P_i^{fg,[xy,h]} = P_{tr}^{f,[xy,h]}, \forall i \in \Psi^{SS}; \qquad (23)$$

$$\sum_f P_i^{f,[xy,h]} = q_i^{[xy,h]} P_i, \forall i \in \Psi; \qquad (24)$$

$$q_i^{[xy,h]} \ge 1 - p_i^{[xy,h]}, \forall i \in \Psi \qquad (25)$$

$$-MF_i^f \le P_i^{f,[xy,h]} \le MF_i^f, \forall i \in \Psi, \forall f \in \Omega; \qquad (26)$$

$$-Mk_i^{fg,[xy,h]} \le P_i^{fg,[xy,h]} \le Mk_i^{fg,[xy,h]}, \forall ij \in \Upsilon, \forall f \in \Omega; \qquad (27)$$

$$-Mk_{ij}^{f,[xy,h]} \le P_{ij}^{f,[xy,h]} \le Mk_{ij}^{f,[xy,h]]}, \forall ij \in \Upsilon, \forall f \in \Omega; \qquad (28)$$

$$-S_{fd}^f \le P_{ij}^{f,[xy,h]} \le S_{fd}^f, \forall ij \in \Upsilon, \forall f \in \Omega; \qquad (29)$$

$$P_{tr}^{f,[xy,h]} \le S_{tr}^f, \forall f \in \Omega^{tr}, \qquad (30)$$

where $\forall [xy,h]$ is applicable to all the formulas (20) to (30), and where $k_{ij}^{f,[xy,h]}$ is a 0-1 variable indicating a connection state of the feeder segment of the feeder line f that is contained in the feeder corridor ij in a case where the feeder segment of the feeder line h that is contained in the feeder corridor xy fails, with $k_{ij}^{f,[xy,h]}=1$ indicating being connected and $k_{ij}^{f,[xy,h]}=0$ indicating being disconnected, $p_i^{[xy,h]}$ is a 0-1 variable indicating an affected state of the load at the node i in the case where the feeder segment of the feeder line h that is contained in the feeder corridor xy fails, with $p_i^{[xy,h]}=1$ indicating being affected to lose power supply and $p_i^{[xy,h]}=0$ indicating not being affected, $P_{ij}^{f,[xy,h]}$ indicates active power flowing from the node i to the node j through the feeder line f in the case where the feeder segment of the feeder line h that is contained in the feeder corridor xy fails, $P_i^{f,[xy,h]}$ indicates active load power at the node i where the feeder line f is located in the case where the feeder segment of the feeder line h that is contained in the feeder corridor xy fails, $P_i^{fg,[xy,h]}$ indicates active power flowing from the feeder line f to the feeder line g at the node i via the interconnection switch in the case where the feeder segment of the feeder line h that is contained in the feeder corridor xy fails, $P_{tr}^{f,[xy,h]}$ indicates active power outputted from the transformer tr to the feeder line f in the case where the feeder segment of the feeder line h that is contained in the feeder corridor xy fails, $P_i^{f,[xy,h]}$ indicates active power outputted from the transformer tr to the feeder line f in the case where the feeder segment of the feeder line h that is contained in the feeder corridor xr fails, $q_i^{[xy,h]}$ is a 0-1 variable indicating a state of power supply at the node i in the case where the feeder segment of the feeder line h that is contained in the feeder corridor xy fails, with $q_i^{[xy,h]}=1$ indicating normal power supply and $p_i^{[xy,h]}=0$ indicating loss of power supply, and

[xy,h] indicates a scenario in which the feeder segment of the feeder line h that is contained in the feeder corridor xy fails.

4. The method according to claim 1, wherein the constraint conditions further comprise constraints of equipment construction, as expressed by the following formulas (31) to (36):

$$k_{ij}^{f,NO} \le l_{ij}^f, \qquad (31)$$
$$\forall ij \in \gamma,$$
$$\forall f \in \Omega;$$

$$k_{ij}^{f,[xy,h]} \le l_{ij}^f, \qquad (32)$$
$$\forall ij \in \gamma,$$
$$\forall f \in \Omega,$$
$$\forall [xy, h];$$

$$k_i^{fg,[xy,h]} \le l_i^{fg}, \qquad (33)$$
$$\forall i \in \Psi,$$
$$\forall fg,$$
$$\forall [xy, h];$$

$$\sum_f l_{ij}^f \le N_{ij} l_{ij}, \qquad (34)$$
$$\forall ij \in \gamma;$$

$$\sum_{f \in \Omega^{tr}} l^f \le N^{tr} u^{tr}, \qquad (35)$$
$$\forall tr;$$

$$\sum_{tr \in \Lambda^{SS}} u^{tr} \le N^{SS} u^{SS}, \qquad (36)$$
$$\forall SS,$$

where $N_{ij}$ indicates a number of the feeder segments that may be contained in the feeder corridor ij, $N^{tr}$ indicates a number of the feeder lines that may be arranged from the transformer tr, $N^{SS}$ indicates a number of the transformers that may be supported by the substation SS, and $\Lambda^{SS}$ indicates a set of the transformers belonging to the substation SS.

* * * * *